US007884701B2

(12) United States Patent
Tsui et al.

(10) Patent No.: US 7,884,701 B2
(45) Date of Patent: Feb. 8, 2011

(54) EXTERNAL BARRIER OPERATOR DEVICE

(76) Inventors: Gallen Ka Leung Tsui, 17 Sheard Avenue, Brampton, Ontario (CA) L6Y 1J3; Philip Y. W. Tsui, 17 Sheard Avenue, Brampton, Ontario (CA) L6Y 1J3

( * ) Notice: Subject to any disclaimer, the term of this patent is extended or adjusted under 35 U.S.C. 154(b) by 937 days.

(21) Appl. No.: 11/523,863

(22) Filed: Sep. 19, 2006

(65) Prior Publication Data

US 2007/0063815 A1 Mar. 22, 2007

Related U.S. Application Data

(60) Provisional application No. 60/719,436, filed on Sep. 21, 2005.

(51) Int. Cl.
*H04Q 9/00* (2006.01)
*B60R 25/00* (2006.01)
*G05B 11/01* (2006.01)

(52) U.S. Cl. ................................ 340/5.71; 340/310.11

(58) Field of Classification Search ................ 340/5.71, 340/310.11
See application file for complete search history.

(56) References Cited

U.S. PATENT DOCUMENTS 3,631,498 A * 12/1971 Bachhuber, Jr. ........ 340/825.69
4,463,340 A * 7/1984 Adkins et al. .............. 307/10.4
4,581,606 A 4/1986 Mallory
4,928,098 A 5/1990 Dannhaeuser
4,929,877 A * 5/1990 Clark et al. ................. 318/560
5,089,692 A 2/1992 Tonnesson
5,107,258 A 4/1992 Soum
5,600,324 A 2/1997 Reed et al.
5,680,134 A 10/1997 Tsui
5,774,065 A 6/1998 Mabuchi et al.
5,841,390 A 11/1998 Tsui
5,923,758 A 7/1999 Khamharn et al.
5,969,637 A 10/1999 Doppelt et al.
5,994,998 A * 11/1999 Fisher et al. ................ 375/258
6,005,508 A 12/1999 Tsui
6,025,785 A 2/2000 Farris et al.
6,078,271 A 6/2000 Roddy et al.
6,154,544 A 11/2000 Farris et al.
6,169,492 B1 1/2001 Dabbish
6,225,889 B1 5/2001 Furuta et al.
6,243,000 B1 6/2001 Tsui
6,249,673 B1 6/2001 Tsui
6,359,558 B1 3/2002 Tsui
6,388,559 B1 * 5/2002 Cohen ....................... 340/5.71
6,441,719 B1 8/2002 Tsui (Continued)

FOREIGN PATENT DOCUMENTS

WO WO 99/41693 8/1999

*Primary Examiner*—Benjamin C Lee
*Assistant Examiner*—Andrew Bee
(74) *Attorney, Agent, or Firm*—Dickstein Shapiro LLP

(57) ABSTRACT

A receiver is adapted to receive one or more wireless signals, while also being able to provide a barrier actuation signal to a barrier operator over a signaling line. The barrier operator may then be adapted to actuate a barrier in response to receiving the barrier actuation signal. The signaling line is further used to provide power from the barrier operator to the receiver. In one embodiment, the barrier operator is a garage door opener and the signaling line is coupled to the receiver and a garage door wall button. Alternatively, the receiver may replace the garage door wall button of the barrier operator.

35 Claims, 6 Drawing Sheets

U.S. PATENT DOCUMENTS

| | | | | |
|---|---|---|---|---|
| 6,617,975 | B1 | 9/2003 | Burgess | |
| 6,661,350 | B1 * | 12/2003 | Rohrberg et al. | 340/825.69 |
| 6,690,796 | B1 | 2/2004 | Farris et al. | |
| 6,989,760 | B2 * | 1/2006 | Dierking et al. | 340/686.1 |
| 7,397,342 | B2 * | 7/2008 | Mullet et al. | 340/5.22 |
| 2001/0034213 | A1 | 10/2001 | Tsui | |
| 2002/0080010 | A1 * | 6/2002 | Zhang | 340/310.06 |
| 2002/0144467 | A1 * | 10/2002 | Teich | 49/506 |
| 2004/0189090 | A1 * | 9/2004 | Yanagida et al. | 307/10.1 |
| 2004/0266492 | A1 * | 12/2004 | Lehr et al. | 455/572 |
| 2005/0063363 | A1 * | 3/2005 | Lazar et al. | 370/352 |
| 2006/0184456 | A1 * | 8/2006 | de Janasz | 705/72 |

* cited by examiner

EXTERNAL BARRIER OPERATOR DEVICE

CROSS-REFERENCE TO RELATED APPLICATION

This application claims the benefit of U.S. Provisional Application No. 60/719,436, filed Sep. 21, 2005.

FIELD OF THE INVENTION

The invention relates in general to controlling the operation of a barrier and, in particular, to an external barrier operator device.

BACKGROUND

The radio receiver has traditionally been a critical element for barrier operators, such as gates and garage door openers (GDOs). Their function is to receive a radio signal from a remote control, where a valid radio signal will cause the barrier operator to be actuated. Radio receivers are typically built-in to the barrier operators. However, there are circumstances in which having the receiver external to the barrier operator may be advantageous. For example, if the built-in receiver ceases to function, it will be easier and more efficient to add an external receiver, rather than attempting to repair the built-in receiver since the built-in receiver will likely be integrated into the main control board. Another example is based on the fact that rolling code technology has been the industry standard for most barrier operators since 1997, while barrier operators manufactured before 1997 used fixed code technology. In order to convert from fixed code to rolling code, one of the easiest ways is to simply add an external receiver that operates based on rolling code technology.

While external receivers have been on the market for some time, they typically function as a secondary receiver. Namely, external receivers typically have a relay that is triggered in the event of a valid wireless signal being received. This relay will be connected to either the wall button in parallel or directly to the input terminal of the barrier operator (e.g., GDO). In the case of a connection to a wall button, when the relay on the external receiver is activated, it simulates the action of someone pressing the wall button, therefore the GDO will be actuated. However, power must also be supplied to the receiver. While there may be an available AC power source, often time there may not be an available outlet. In this case, the external receiver will need to be mounted adjacent to the main GDO unit. For most homeowners, this may be a difficult and dangerous task.

Therefore, there is a need for an improved external receiver and/or transmitter that overcomes one or more of the aforementioned obstacles.

SUMMARY

Disclosed and claimed herein is an external barrier operator device. In one embodiment, a receiver is adapted to receive one or more wireless signals, wherein the receiver is further to provide a barrier actuation signal to a barrier operator over a signaling line. In addition, the barrier operator is adapted to actuate a barrier in response to the barrier actuation signal, and the barrier operator is further to provide power to the receiver using the signaling line.

Other embodiments are disclosed and claimed herein.

DETAILED DESCRIPTION OF THE PREFERRED EMBODIMENTS

Figure 1:
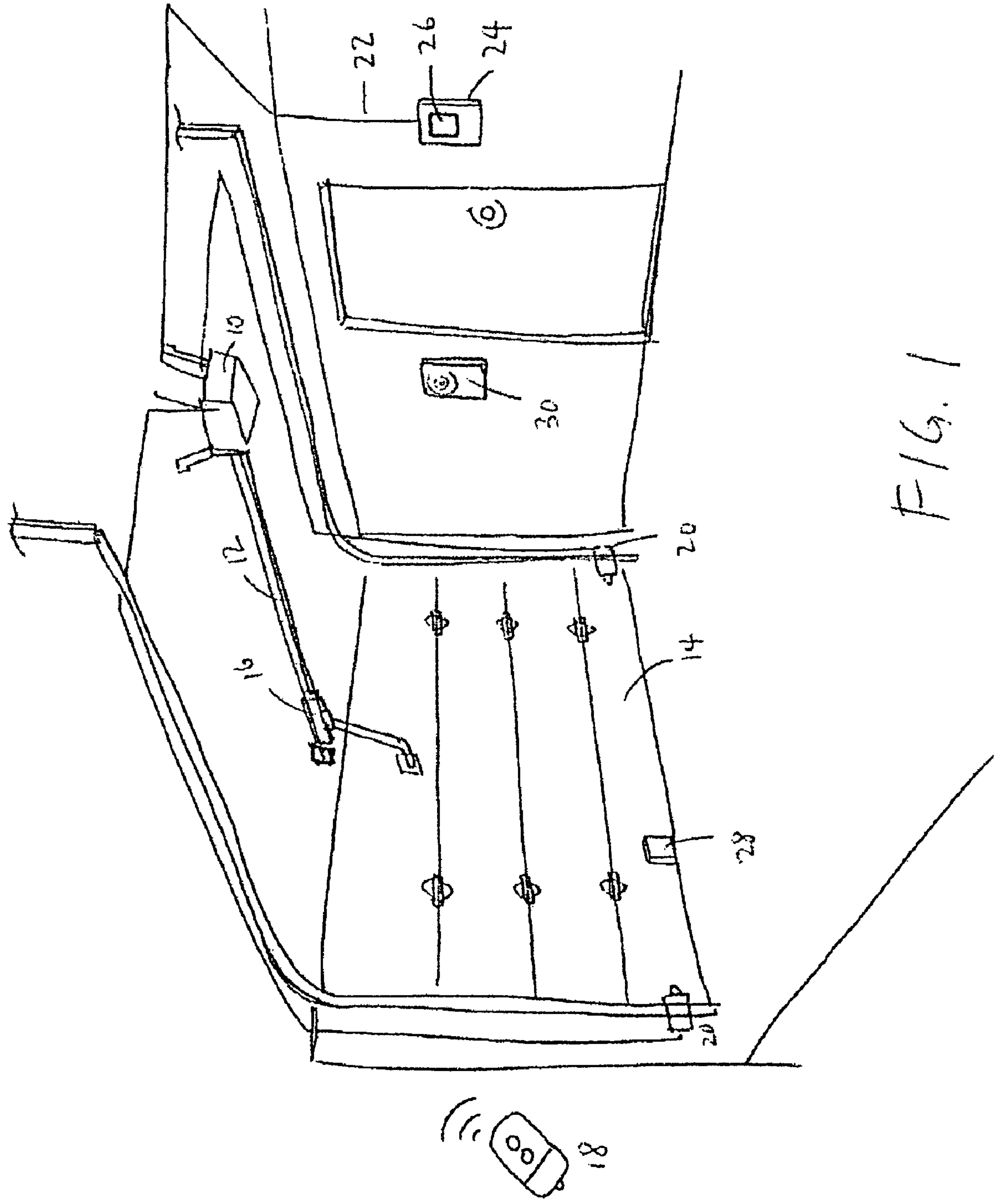
FIG. 1 is a general schematic diagram of one embodiment of a barrier control system, provided in accordance with the principles of the invention.

In one embodiment of the invention, a receiver is adapted to receive one or more wireless signals, while also being able to provide a barrier actuation signal to a barrier operator over a signaling line. The barrier operator may then be adapted to actuate a barrier in response to receiving the barrier actuation signal. Moreover, the signaling line may further be used to provide power from the barrier operator to the receiver.

In certain embodiments, the barrier operator is a garage door opener and the signaling line is coupled to the receiver and a garage door wall button. Alternatively, the receiver may replace the garage door wall button of the barrier operator.

Another aspect of the invention is to provide a receiver having a receiving circuit, a processor, and a memory coupled to the processor, wherein the memory includes instruction sequences to cause the processor to provide a barrier actuation signal over the signaling line in response to receiving a valid wireless activation signal using the receiving circuit. In one embodiment, the barrier activation signal may be a short circuit detectable by the barrier operator.

In one or more embodiments, the receiver may be used to determine a type of received wireless signal, determine a position of the barrier if the type of received wireless signal is from a remote control device, and provide the barrier actuation signal to the barrier operator to change the position of the barrier. It should be appreciated that the type of received wireless signal may include one or more of a remote control signal, a barrier sensor signal and a carbon monoxide detector signal.

In certain other embodiments of the invention, the aforementioned receiver may be a transceiver that further includes a transmitter circuit for transmitting one or more wireless signals to a remote receiver. Similarly, the aforementioned receiver may instead be a transmitter that is adapted to transmit wireless signals based on barrier operator signals received from the barrier operator over the signaling line that connects the transmitter to the barrier operator. The barrier operator signals may be representative of barrier position information, which may then be transmitted to a remote receiver.

In general terms, installation of the aforementioned external receiver and/or transmitter may involve replacing the existing wall button of a GDO with the external receiver and/or transmitter, without the need for additional wiring. In one embodiment, this has the advantage of simplifying the installation process since the wall button is typically easily reached since it is usually located next to an entry to the house, or elsewhere in the garage below the eye level. As such, no climbing is needed. In addition, since the signaling wires only carry a low voltage DC current of roughly 24V DC, the installation may be further simplified and safe.

In certain embodiments of the invention, a timing mechanism may be used to close a barrier (e.g., garage door) that has been opened for a predetermined time period. Additionally, a carbon monoxide (CO) level monitor may be incorporated into the barrier closer. In one embodiment, the CO monitor is able to monitor the CO level inside the garage. If the CO level exceed a predetermined safety limit, the garage door can be automatically opened in order to improve ventilation.

Referring to FIG. 1, depicted is a GDO positioned within a garage, mounted on the ceiling of the garage. A head unit 10 with an electric motor is connected to a rail assembly 12. In one embodiment, the head unit 10 opens and closes the garage door 14 using a trolley 16 which moves along the rail assembly 12. The head unit 10 includes a radio receiver to receive signals from a transmitter 18 or one or more sensors (e.g., sensor 28). It should appreciated that multiple transmitters may similarly be used to operate the GDO. Furthermore, a pair of safety infrared sensors 20 are installed. When the infrared signal is blocked while the door is closing, the microprocessor causes the reversal or opening of the door. Signaling wires 22 may be used to connect the wall console 24 to the head unit 10. When the switch 26 on the wall console 24 is pressed, the GDO will be energized causing the door to either open or close.

A garage door sensor 28 may be used to detect whether the garage door is in the fully closed position or not. A transmitter built into this sensor may be activated when the garage door is not fully closed, as disclosed in U.S. Pat. No. 6,597,291. In addition, a CO detector 30 may be used to monitor if and when the CO level in the garage exceeds a predetermined safety limit.

The signaling wires connection may simply be an on/off switch, or alternatively a normally open switch. In this case, when the switch is closed the GDO will be activated. On the other hand, when the switch is open, the GDO will not be activated. However, due to the fact that the signaling wires 22 are normally more than 10 feet, as well as the fact that the input pin to the microprocessor is normally a high impedance input, it may be difficult to have a reliable on/off signal. In order to resolve this reliability issue, the GDO may be designed to have current flowing through these signaling wires 22 between the wall button 26 and the head unit 10. In this case, when the wall button 26 is pressed, it will create a short circuit, thereby enabling the GDO to detect whether the wall button 26 has been pressed or not. In one embodiment, this may provide a more reliable way to detect whether the wall button 26 is pressed than having a conventional on/off switch.

Figure 2A:
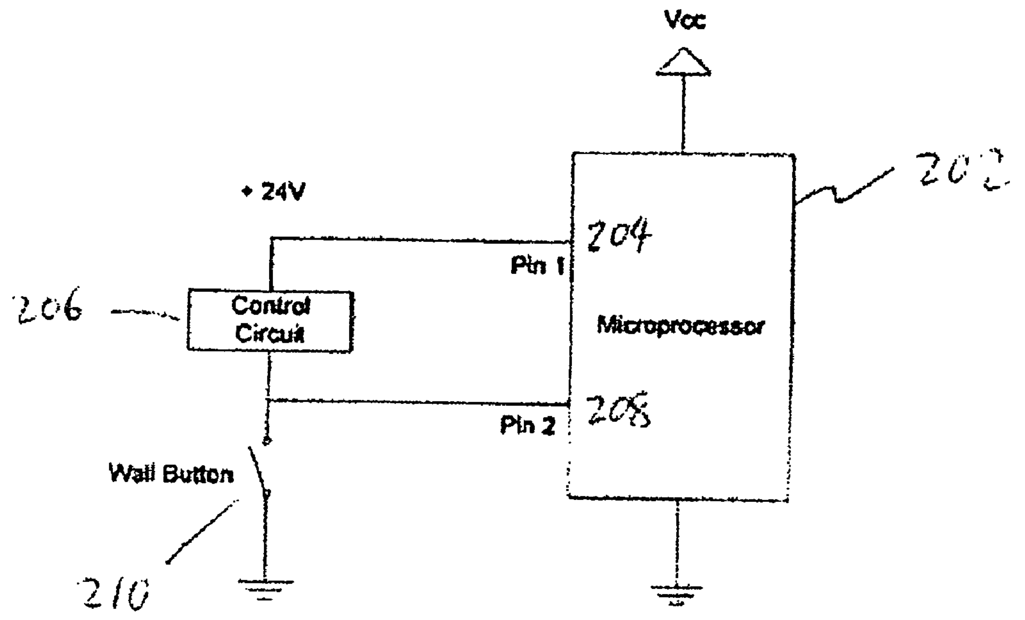
FIG. 2*a* is one embodiment of a simplified schematic diagrams depicting the connection between a barrier operator and a wall button.

FIG. 2*a* depicts a circuit of the connection between a garage door opener and its wall button. In particular, the microprocessor 202 may have multiple input and output pins. In this embodiment, Pin 204 and Pin 208 are being used to detect the wall button activation. Pin 204 is used as an output pin to control circuit 206, which may be used to provide a DC output (e.g., 24V DC). Pin 208 is an input pin, which monitors an incoming signal, and is connected to wall button 210, as shown in FIG. 2*a*. Wall button 210 is also connected to ground.

In one embodiment, when the wall button 210 is not activated, Pin 208 may receive a high signal. However, when the wall button 210 is pressed, since it is connected to the ground, Pin 208 will detect a low signal. When Pin 208 reads a low signal, this will indicate that the wall button 210 has been activated and that the GDO should be energized. With control circuit 206, current can be drawn from a DC supply (e.g., 24V DC), as controlled by Pin 204, so long as the drawn current does not exceed the limit which causes Pin 208 to read a low state. Using such a circuit, limited current can be drawn from the signaling wires (e.g., signaling wires 22). In the case where the external receiver can operate at such a low current, external power such as AC power will not be required.

Figure 2B:
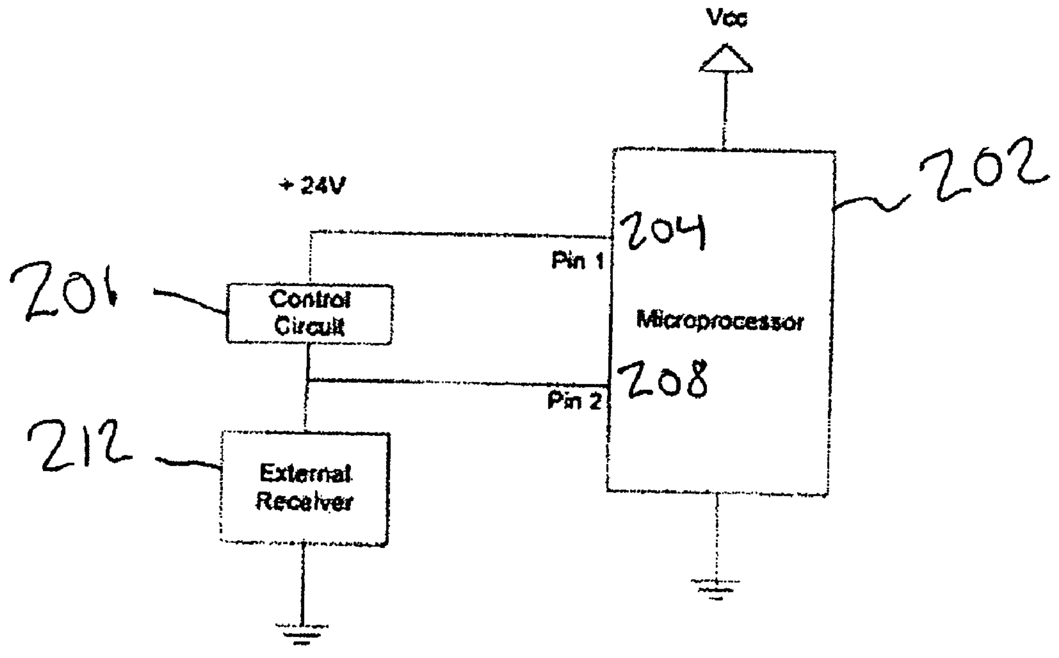
FIG. 2*b* is another embodiment of the simplified schematic diagram of FIG. 2*a* in which the wall button has been replaced with an external receiver.

As previously mentioned, one aspect of the invention is to replace (or append to) a conventional wall button of a barrier operator with an external receiver. To that end, FIG. 2*b* shows the connection of an external receiver 212 to the GDO's microprocessor 202, in which an external receiver 212 has been used to replace wall button 210. To this end, one aspect of the invention is to power the external receiver 212 using the GDO's signaling lines.

Figure 3:
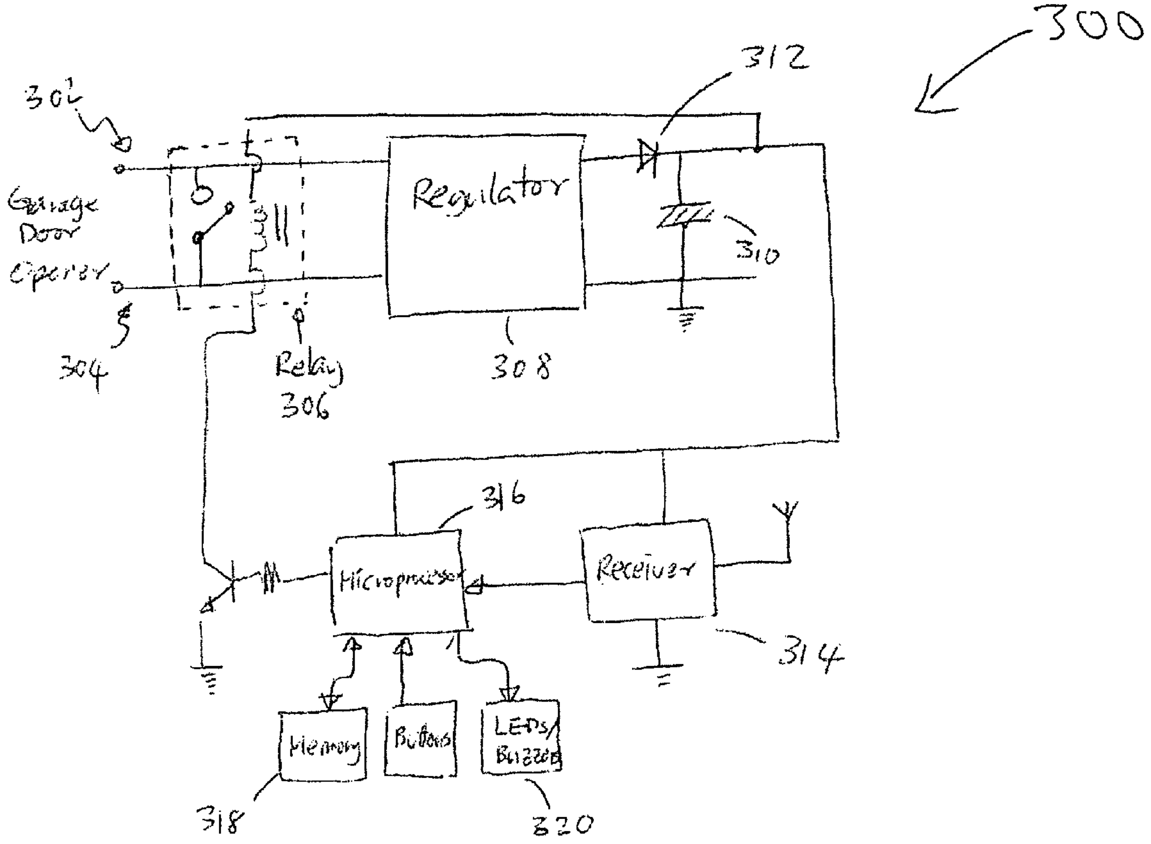
FIG. 3 is a simplified schematic of the external receiver of FIG. 2*b;*

Low current consumption in an external receiver may be desirable in order for the external receiver to operate with the current supplied by the GDO through its signaling wires (e.g, signaling wires 22). In order to achieve low current consumption, and to be able to operate with such current limitation, several criteria must be taken into consideration. To that end, FIG. 3 depicts a simplified block diagram of an external receiver 300 usable to replace a GDO's wall button, as shown above with reference to FIG. 2*b*. While the present disclosure is written in terms of replacing the GDO's wall button, it should equally be appreciated that the external receiver may be similarly appended to an existing GDO's wall button.

In the embodiment of FIG. 3, wires 302 and 304 are the signaling wires from the GDO. Relay 306 within the external receiver is connected to the signaling wires 302 and 304. Regulator 308 is used to regulate the voltage in order to lower the voltage level. In this embodiment, the lower voltage will result in the overall current consumption to also be lower.

Electric double layered capacitor 310, also known as "Gold Capacitor," may be used to supply a stable voltage to the rest of the circuit 300. In some cases, the current required to trigger the relay 306 could be more than the maximum current supplied by the GDO through the signaling wires 302 and 304. Therefore, a capacitor 310 may be used to supply the electric current to trigger the relay 306. In one embodiment, an electric double layered capacitor is used because of its high volumetric efficiency. If an electrolytic capacitor is required to hold the same capacity, its size may be much larger (e.g., more than 5 times larger). Diode 312 is used to control the current flow, ensuring the capacitor 310 will not discharge itself rapidly when the relay 306 is triggered through the signaling wires 302 and 304. Capacitor 310 may only be able to discharge itself slowly through receiver 314, microprocessor 316, and relay 306.

When a signal is received by the receiver 314, this signal may be analyzed by microprocessor 316 in order to determine whether it is a valid signal. In order to verify whether the received signal is a valid signal, microprocessor may analyze the received data format and check whether the received signal has been programmed into the receiver's memory 318. In addition, if the signal is received from a sensor or transmitter that has been programmed into the receiver, the microprocessor 316 may trigger the relay 306 or other output means, such as LEDs or buzzer 320. It should be appreciated that signals received from different devices may result in different actions. For instance, when a valid remote control signal is received, the microprocessor 316 will activate the relay 306, which is connected to the garage door opener through the signaling wires 302 and 304. This activation signal will trigger the garage door opener in order to open/close the garage door.

While the aforementioned embodiments have been described in relation to an external receiver, in another embodiment the external receiver is an external transceiver. In such an embodiment, the external transceiver may be used to relay the received signal to another wireless receiver. For example, when the external transceiver receives a garage door sensor signal, it may then transmit this signal to a wireless receiver/transceiver located inside a house to indicate the garage door is open.

In still another embodiment, the external device (which replaces or is appended to the GDO's wall button) may consist of only a transmitter. In this case, the transmitter may be electrically connected to the GDO's signaling wires (e.g., signaling wires 302 and 304) and receive power therefrom. In this embodiment, the GDO signaling wires may also provide barrier information, such as position information to the external transmitter. Such information may then be relayed to a remote receiver which, in one embodiment may be located within the user's home or the like. In this fashion, the user can be alerted to the barrier's position, or receiver other barrier information, using a simple add-on external transmitter device.

Similarly, when the GDO is operating, the voltage in the signaling wires may drop from approximately 30V to approximately 24V. Such a voltage drop may be used by the external device (e.g., receiver, transmitter and/or transceiver) as an indication that the GDO is in operation. Thus, upon detected of a voltage drop on the signaling wires, the external device may transmit a signal to a remote device (e.g., inside the house) indicating that the GDO is in operation.

Figure 4:
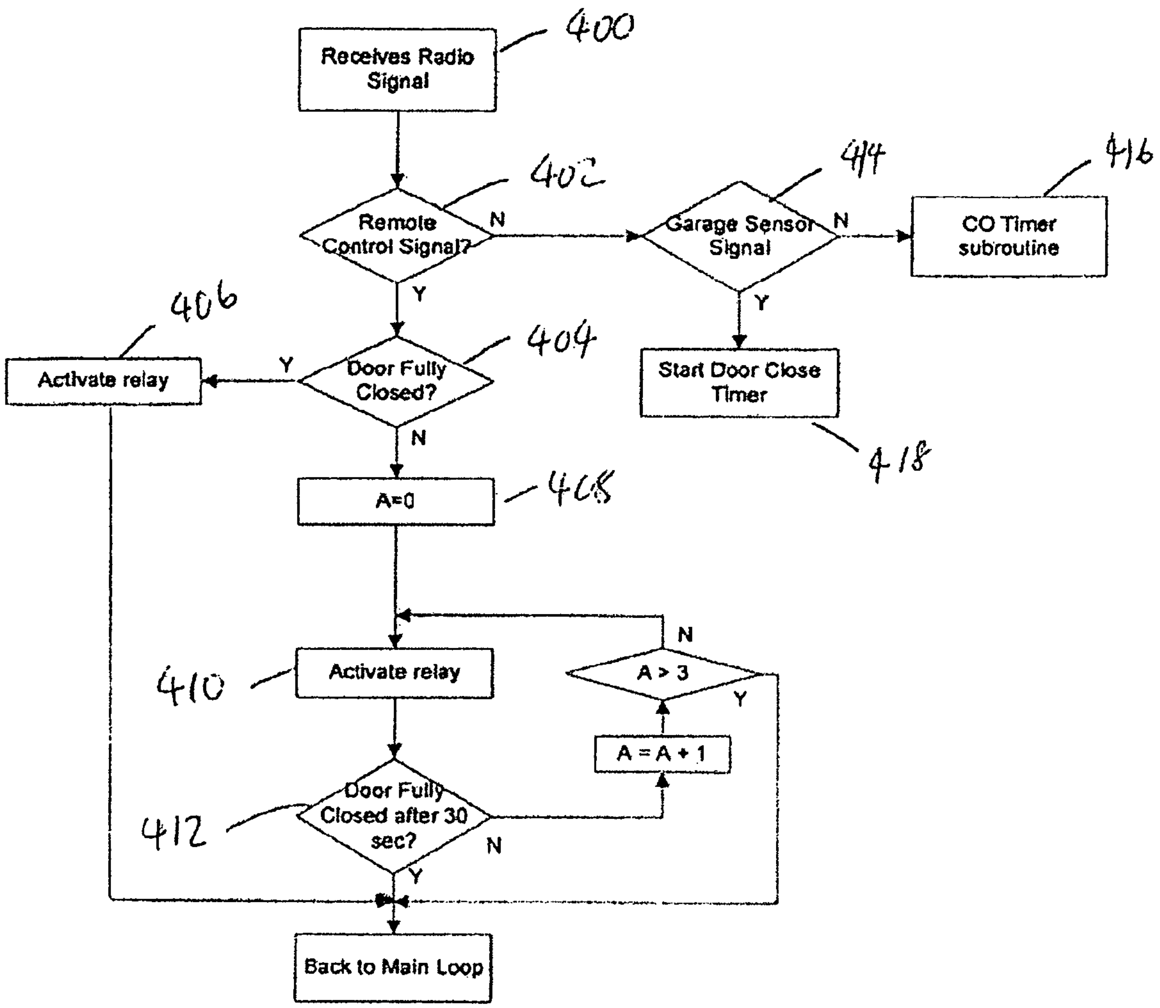
FIG. 4 is one embodiment of a process for receiving a barrier actuating signal using a receiver consistent with the principles of the invention.

Referring now to FIG. 4, depicted is one embodiment of how a valid remote control signal may be received by an external receiver/transceiver consistent with the principles of the invention. The process begins when a signal is received by the receiver/transceiver at block 400. The receiver/transceiver's microprocessor may then classify whether the signal is transmitted from a remote control, garage sensor, or CO sensor. If it is determined that the signal is from a remote control, as shown in block 402, a further determination is made as to whether the barrier is in the fully closed position (block 404). If the barrier is in the fully closed position, the relay may be activated at block 406 and the barrier will start to open. If, on the other hand, the door is not in the fully closed position, the relay will be triggered to close the barrier (block 410). In addition, the activating variable A is reset to zero at block 408. Thereafter, at block 412, a further determination will be made as to whether the garage door is fully closed after 30 seconds. If the garage door is still not fully closed after 30 seconds, the process will loop back and the relay will be triggered again. In the embodiment of FIG. 4, this loop may continue for up to 3 times. If after 3 attempts the barrier is still not closed, the process will terminate and return to the main loop. It should of course be understood that the number of attempts may be more or less than 3.

In the case where it is determined at block 402 that the received signal is not from a remote control, the process will move to block 414 where it can be determined whether the signal was from a garage sensor. If so, the process may proceed to block 418 where a door close timer may be started (See FIG. 5 below). If, on the other hand, the signal is not from a remote control nor a garage sensor, it will be determined to be a signal from a CO sensor. In this case, the process will proceed to block 416 where a CO timer subroutine may be started (See FIG. 6 below).

As previously mentioned, other than receiving wireless signal from handheld remote controls, an external receiver/transceiver in accordance with the invention may also receive signals from different sensors, Such sensors may include garage door sensor and/or a CO sensor. In one embodiment, a garage door sensor is a device that monitors the position of the garage door. More specifically, it may monitor whether the garage door is in the fully closed position or not. U.S. Pat. No. 6,597,291 discloses multiple approaches that can be used to achieve this monitoring functionality. In one embodiment, the position of the garage door is monitored to ensure that the garage door will only open for a short period of time, after which the garage door will be closed automatically and not left open.

Figure 5:
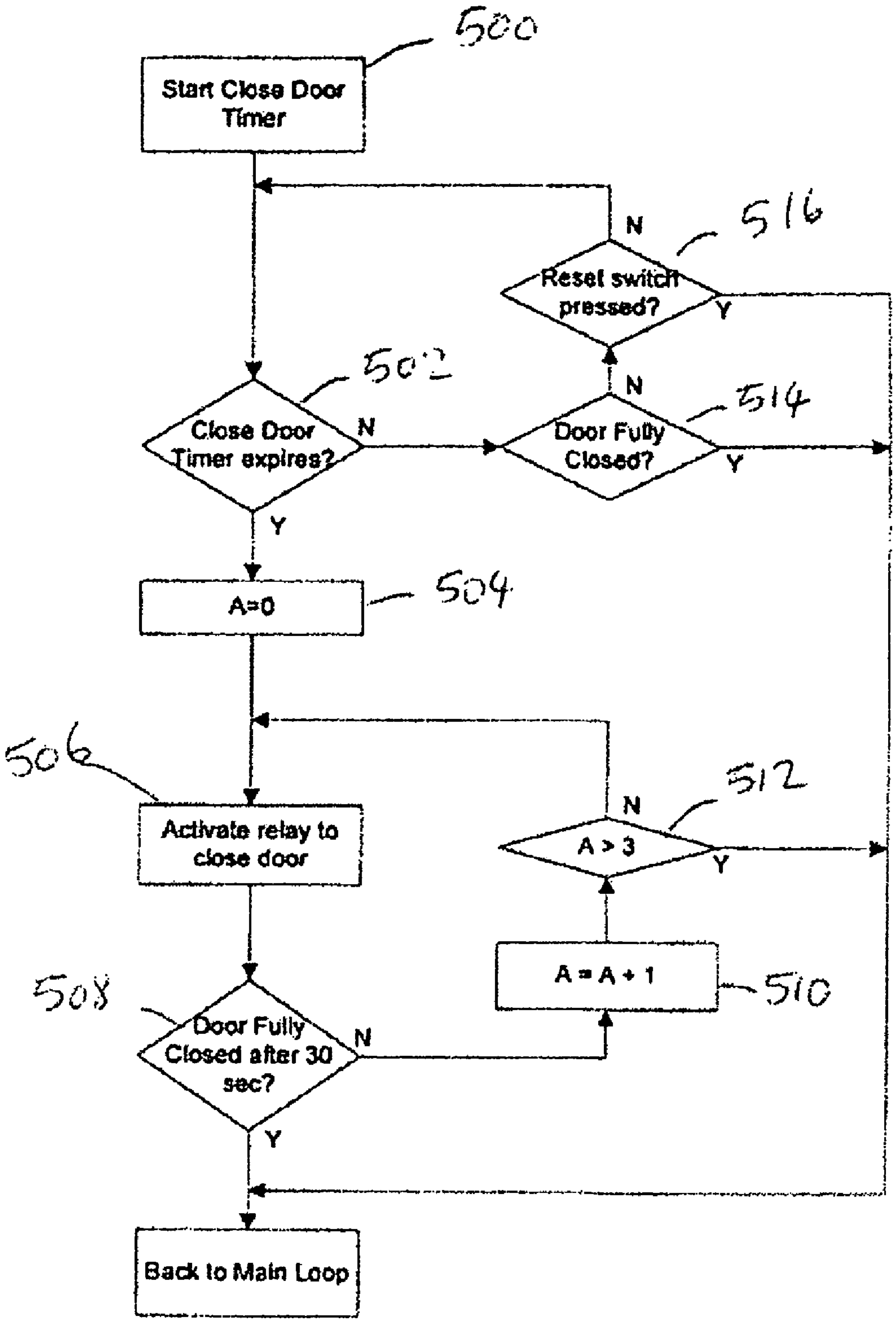
FIG. 5 is one embodiment of a process for receiving a barrier sensor signal using a receiver consistent with the principles of the invention.

FIG. 5 depicts one embodiment of a process for processing a garage sensor signal of block 414 of FIG. 3. This process begins at block 500 where the "Close Door" timer starts. At block 502, the timer is monitored to determine when it expires. Once it expires, an activation variable A is set to zero (block 504) and a connected relay is triggered at block 506 in order to close the door. Thereafter, the process monitors whether the door is fully closed after 30 seconds (block 508). If not, then the process attempts to trigger the relay again in order to close the door, with the activation variable A being incremented. Blocks 504, 510, and 512 will monitor the total number of attempts until a maximum number of attempts is reached (e.g., 3). If the maximum number of attempts is reached, the process will terminate and return to the main loop.

In the embodiment of FIG. 5, there are two scenarios in which the timer will be disabled before it expires. In particular, when it is determined at block 502 that the timer has not expired, a determination is made as to whether the door is fully closed or not (block 514). If the door is in fact fully closed before the timer expires, the timer will be cancelled since the door has already been closed. Additionally, if the timer has not expired and the door is not fully closed, the process will then make a determination at block 516 as to whether the reset switch has been pressed. For instance, if a user plans on staying in the garage for an extended period of time and would like to have the door open, a reset switch can be activated so that the timer will be cancelled and the automatic closing feature overridden.

Figure 6:
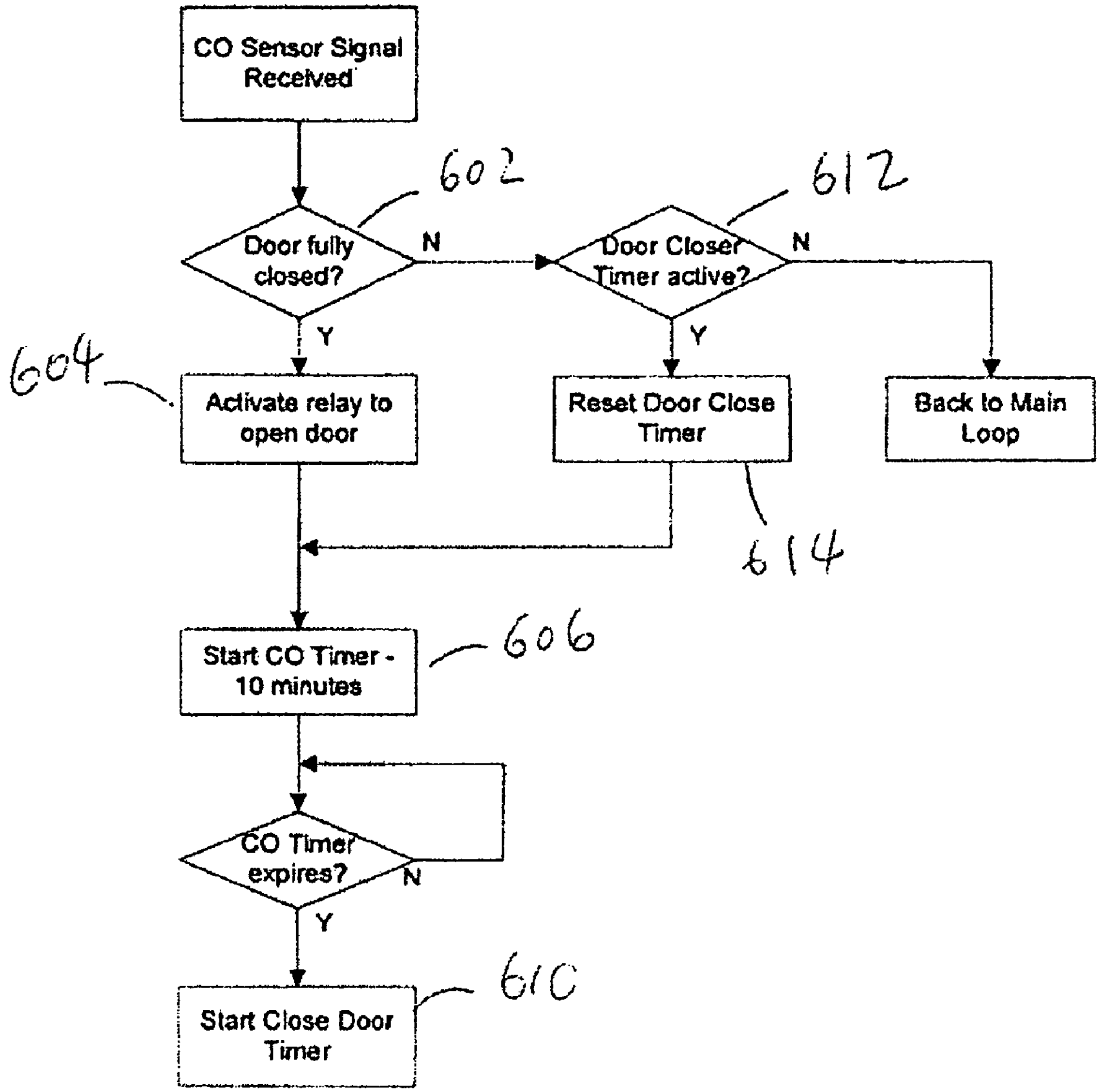
FIG. 6 is another embodiment of a process for receiving a barrier sensor signal using a receiver consistent with the principles of the invention.

Referring now to FIG. 6, depicted is an embodiment of a process for processing a CO signal of block 416 of FIG. 3. In particular, if the received signal is from a CO sensor, this would indicate that the CO level in the garage exceeds a predetermined safety level. In this case, the receiver/transceiver will cause the garage door to open in order to improve ventilation. To that end, the process of FIG. 6 beings with a determination as to whether the door is closed or not (block 602). If the door is closed, the process will activate the relay at block 604 to open the garage door. Thereafter, a CO timer will be started at block 606. While in one embodiment, the CO timer is programmed to be 10 minutes, it should equally be appreciated that it may be longer or shorter.

Once the CO timer expires, the process will move to block step 610 where the previously-discussed "Door Close" timer will be started. This will ensure that the door closes once the CO level drops back to a safe level.

If, on the other hand, it is determined at block 602 that the door is not fully closed, then the process will move to block 612 where another determination is made as to whether the "Door Close" timer is active. If so, the "Door close" timer will be canceled at block 614, followed by the starting of the CO timer at block 606. If, however, the "Door Close" timer is not active when the door is open, that would indicate that the door was intentionally left open and, as such, no further action is performed.

While the preceding description has been directed to particular embodiments, it is understood that those skilled in the art may conceive modifications and/or variations to the specific embodiments described herein. For example, the invention is not intended to be limited to the garage door application, but is equally applicable to any barrier control system. Any such modifications or variations which fall within the purview of this description are intended to be included herein as well. It is understood that the description herein is intended to be illustrative only and is not intended to limit the scope of the invention.

What is claimed is:

1. A receiver adapted to receive one or more wireless signals, wherein said receiver is further to provide a barrier actuation signal to a barrier operator over a signaling line, said barrier operator being adapted to actuate a barrier in response to the barrier actuation signal, and wherein said signaling line is further to provide a DC power from said barrier operator to the receiver, the receiver comprising a relay switch that, when activated, causes the barrier actuation signal to be transmitted over the signaling line;

a capacitor to discharge a voltage for powering said relay switch, and a regulator coupled between said relay switch and said capacitor, the regulator to regulate the DC power supplied by said barrier operator through the signaling line.

2. The receiver of claim 1, wherein the barrier operator is a garage door opener and the signaling line is coupled to said receiver and a garage door wall button.

3. The receiver of claim 1, wherein the barrier operator is a garage door opener and the receiver is to replace a garage door wall button of the barrier operator.

4. The receiver of claim 1, comprising a receiving circuit, a processor, and a memory coupled to the processor, wherein the memory includes instruction sequences to cause the processor to provide said barrier actuation signal over the signaling line in response to receiving a valid wireless activation signal using said receiving circuit.

5. The receiver of claim 4, wherein said barrier activation signal is a short circuit detectable by said barrier operator.

6. The receiver of claim 1, comprising a processor and a memory coupled to the processor, wherein the memory includes instruction sequences to cause the processor to:

determine a type of received wireless signal;

determine a position of the barrier if the type of received wireless signal is from a remote control device; and provide said barrier actuation signal to the barrier operator to change said position of the barrier.

7. The receiver of claim 6, wherein said type of received wireless signal includes one or more of a remote control signal, a barrier sensor signal and a carbon monoxide detector signal.

8. The receiver of claim 1, wherein said receiver is a transceiver that further includes a transmitter circuit for transmitting one or more wireless signals to a remote receiver.

9. The receiver of claim 8, wherein said barrier operator is further to provide barrier information to said transmitter over said signaling line, and wherein said transmitter circuit is then to transmit said barrier information to the remote receiver.

10. The receiver of claim 1, wherein said receiver is to detect a voltage drop in said signaling line indicating that said barrier operator is actuating said barrier.

11. A transmitter adapted to transmit wireless signals based on barrier operator signals received from a barrier operator over a signaling line that connects the transmitter to the barrier operator and provide a barrier actuation signal to the barrier operator over the signaling line, and wherein said signaling line is further to provide a DC power from said barrier operator to the transmitter, the transmitter comprising a relay switch that, when activated, causes the barrier actuation signal to be transmitted over the signaling line;

a capacitor to discharge a voltage for powering said relay switch, and a regulator coupled between said relay switch and said capacitor, the regulator to regulate the DC power supplied by said barrier operator through the signaling line.

12. The transmitter of claim 11, wherein the barrier operator is a garage door opener and the signaling line is coupled to said transmitter and a garage door wall button.

13. The transmitter of claim 11, wherein the barrier operator is a garage door opener and the transmitter is to replace, at least in part, a garage door wall button of the barrier operator.

14. The transmitter of claim 11, where the barrier operator signals include barrier position information.

15. The transmitter of claim 11, further including a wireless receiver circuit for receiving a wireless actuation signal from a remote device.

16. The transmitter of claim 15, wherein, in response to receiving said wireless actuation signal, the transmitter provides a barrier actuation signal to the barrier operator over the signaling line.

17. The transmitter of claim 16, wherein said barrier activation signal is a short circuit detectable by said barrier operator.

18. The transmitter of claim 11, wherein said barrier operator signals comprises a voltage drop in said signaling line indicating that said barrier operator is actuating a barrier.

19. A system comprising:

receiver adapted to receive one or more wireless signals, and barrier operator adapted to actuate a barrier in response to a barrier actuation signal received from the receiver over the signaling line, and wherein said signaling line is further to provide a DC power from said barrier operator to the receiver, the receiver comprising a relay switch that, when activated, causes the barrier actuation signal to be transmitted over the signaling line;

a capacitor to discharge a voltage for powering said relay switch, and a regulator coupled between said relay switch and said capacitor, the regulator to regulate the DC power supplied by said barrier operator through the signaling line.

20. The system of claim 19, wherein the barrier operator is a garage door opener and the signaling line is coupled to said receiver and a garage door wall button.

21. The system of claim 19, wherein the barrier operator is a garage door opener and the receiver is to replace a garage door wall button of the barrier operator.

22. The system of claim 19, wherein the receiver includes a receiving circuit, a processor, and a memory coupled to the processor, wherein the memory includes instruction sequences to cause the processor to provide said barrier actuation signal over the signaling line in response to receiving a valid wireless activation signal using said receiving circuit.

23. The system of claim 22, wherein said barrier activation signal is a short circuit detectable by said barrier operator.

24. The system of claim 19, wherein the receiver comprises a processor and a memory coupled to the processor, wherein the memory includes instruction sequences to cause the processor to:

determine a type of received wireless signal;

determine a position of the barrier if the type of received wireless signal is from a remote control device; and provide said barrier actuation signal to the barrier operator to change said position of the barrier.

25. The system of claim 24, wherein said type of received wireless signal includes one or more of a remote control signal, a barrier sensor signal and a carbon monoxide detector signal.

26. The system of claim 19, further comprising a transmitter circuit coupled to the barrier operator for transmitting one or more wireless signals to a remote receiver.

27. The system of claim 19, wherein said barrier operator is further to provide barrier information to said transmitter over said signaling line, and wherein said transmitter circuit is then to transmit said barrier information to the remote receiver.

28. A system comprising:

receiver adapted to receive incoming wireless signals;

transmitter adapted to transmit outgoing wireless signals;

barrier operator coupled to said receiver and transmitter by a signaling line, said barrier operator adapted to actuate a barrier in response to a barrier actuation signal received from the receiver over the signaling line, and wherein said signaling line is further to provide a DC power from said barrier operator to said receiver and said transmitter, wherein at least one of the receiver and transmitter comprises a relay switch that, when activated, causes the barrier actuation signal to be transmitted over the signaling line;

a capacitor to discharge a voltage for powering said relay switch; and a regulator coupled between said relay switch and said capacitor, the regulator to regulate power supplied by said barrier operator through the signaling line.

29. The system of claim 28, wherein the barrier operator is a garage door opener and the receiver and transmitter replace a garage door wall button of the barrier operator.

30. The system of claim 28, wherein the receiver includes a receiving circuit, a processor, and a memory coupled to the processor, wherein the memory includes instruction sequences to cause the processor to provide said barrier actuation signal over the signaling line in response to receiving a valid wireless activation signal using said receiving circuit.

31. The system of claim 28, wherein said barrier activation signal is a short circuit detectable by said barrier operator.

32. The system of claim 28, wherein the receiver comprises a processor and a memory coupled to the processor, wherein the memory includes instruction sequences to cause the processor to:

determine a type of incoming wireless signal;

determine a position of the barrier if the type of incoming wireless signal is from a remote control device; and provide said barrier actuation signal to the barrier operator to change said position of the barrier.

33. The system of claim 32, wherein said type of incoming wireless signal includes one or more of a remote control signal, a barrier sensor signal and a carbon monoxide detector signal.

34. The system of claim 28, wherein said outgoing wireless signals are based on barrier operator signals received from the barrier operator over the signaling line.

35. The system of claim 34, where the barrier operator signals include one or more of barrier position information and a voltage drop in said signaling line indicating that said barrier operator is actuating the barrier.

* * * * *